US006922444B1

(12) United States Patent
Cai et al.

(10) Patent No.: US 6,922,444 B1
(45) Date of Patent: Jul. 26, 2005

(54) SYSTEM AND METHOD FOR PROVIDING ADAPTIVE RATE SELECTION

(75) Inventors: Lujing Cai, Tinton Falls, NJ (US); Danielle Liu, Morganville, NJ (US)

(73) Assignee: GlobespanVirata, Inc., Red Bank, NJ (US)

( * ) Notice: Subject to any disclaimer, the term of this patent is extended or adjusted under 35 U.S.C. 154(b) by 826 days.

(21) Appl. No.: 09/975,446

(22) Filed: Oct. 11, 2001

Related U.S. Application Data

(60) Provisional application No. 60/239,363, filed on Oct. 11, 2000.

(51) Int. Cl.[7] ............................................. H04L 27/28
(52) U.S. Cl. .................. 375/260; 375/240.27; 714/761
(58) Field of Search ............................ 375/260, 240.24, 375/240.27; 714/701, 752, 758, 761, 762

(56) References Cited

U.S. PATENT DOCUMENTS 5,838,128 A * 11/1998 Maiocchi et al. ........... 318/439
5,983,388 A * 11/1999 Friedman et al. ........... 714/776
6,536,001 B1 * 3/2003 Cai et al. .................... 714/701

* cited by examiner

Primary Examiner—Stephen Chin
Assistant Examiner—Kevin Kim
(74) Attorney, Agent, or Firm—Thomas, Kayden, Horstemeyer & Risley

(57) ABSTRACT

A system and method for providing adaptive rate selection mitigates impulse-like noise and allows for interleaving and RS coding, while not excessively delaying data transmission. Generally, the system utilizes a memory and a processor, wherein the processor is programmed by software stored within the memory to perform the step of reading a specified data transmission delay rate for a channel utilized for data transmission. A Reed Solomon encoder is utilized by the adaptive rate system, which performs the steps of: reading a specified number of redundant bytes in a Reed Solomon frame; determining a level of impulse protection control from the number of redundant bytes in the Reed Solomon frame and a maximum code word length; and determining a number of symbols comprised within the Reed Solomon frame. In addition, an interlever is utilized for determining an interlever depth via use of said number of symbols comprised within the Reed Solomon frame and the specified data transmission delay rate for the channel.

38 Claims, 5 Drawing Sheets

SYSTEM AND METHOD FOR PROVIDING ADAPTIVE RATE SELECTION

CROSS-REFERENCE TO RELATED APPLICATIONS

This application claims the benefit of U.S. Provisional Application Ser. No. 60/239,363, filed on Oct. 11, 2000, and entitled "Adaptive Rate Selection Method with Consideration of Impulse Noise Protection Performance," which is incorporated by reference herein in its entirety.

FIELD OF THE INVENTION

The present invention generally relates to telecommunications and, more particularly, is related to a system and method for increasing impulse protection while minimizing decreases in data transmission rates.

BACKGROUND OF THE INVENTION

With advancements in technology, the transmission of voice and data at faster rates and in larger volumes is always in demand. One solution to fulfilling these demands is digital subscriber line (DSL) technology. DSL technology has been introduced into the field of broadband networking, among other reasons, to overcome issues faced by traditional voice band technology. Such issues include, but are not limited to, bandwidth limitations. Multiple DSL technologies exist including, but not limited to, rate adaptive DSL (RADSL), symmetric DSL (SDSL), multi-rate SDSL (M/SDSL), high bit-rate DSL (HDSL), very high bit-rate DSL (VDSL), and asymmetric DSL (ADSL).

ADSL technology utilizes the infrastructure already in place in a public switched telephone network (PSTN), including copper loops, constructed of copper wires, between a customer premise and a central office. Advantageously, ADSL technology does not require replacement of network equipment such as routers, switches, firewalls and Web servers, which are commonly used in today's paradigm for broadband access.

The American national standards institute (ANSI) standardizing body selected discrete multi-tone (DMT) as the modulation scheme for ADSL. DMT is a special implementation of multi-carrier modulation that is based on the discrete Fourier transform, which can conveniently be implemented in a fully digital manner.

Impulse noise is a factor that is considered in the fabrication of DSL systems having DMT transceivers. Specifically, impulse noise, or a burst, is an unwanted disturbance of a relatively short duration that typically results from energy that is coupled from an electrical transient located near DMT transceivers.

To address and alleviate errors caused by impulse noise, and other factors that negatively effect data transmission in a DSL system, typical error correction techniques utilize a redundancy approach in which bits of data are repeated a number of times before transmission. Unfortunately, most redundancy techniques defeat the purpose of high speed and high density data processing and transmission since excessive amounts of data bits are added to a data bit stream to provide for error correction.

Reed Solomon (RS) coding and interleaving are important techniques used in a DMT transceiver that provide error correction with the addition of a minimal number of data bits. RS coding is an error correction code that is widely used due to its relatively large error correction capability when weighed against the minimal added overhead imposed upon a data transmission system. RS codes are an example of a block coding technique where the data bit stream to be transmitted is broken up into RS blocks and redundant data bits are then added to each block. The size of these blocks and the amount of check data bits added to each block is either specified for a particular application or can be user-defined for a closed system. Within each block, data is further divided into a number of symbols that are generally from six to ten bits in size.

An interleaver spreads the error caused by impulse like noise over the number of RS blocks such that each of the frames contains only a small number of error bits. Therefore, the number of DMT symbols in each RS frame is increased. The small number of error bits added can then be corrected by a RS decoder.

Unfortunately, while the longer the interleaving depth (D) is, the better the protection is provided against impulse-like noise, longer interleaving depth also provides longer delay in data transmission. In addition, particular for DMT transceivers, the number of DMT symbols contained in each RS frame is important because the number of DMT symbols per frame also affects delay and payload rate. Therefore, it is necessary to perform a balancing test to allow for interleaving and RS coding, while not excessively delaying data transmission.

SUMMARY OF THE INVENTION

In light of the foregoing, the preferred embodiment of the present invention generally relates to a system for providing an optimum payload in a DSL system by accommodating payload rate, delay and impulse noise generated error correction performance.

Generally, with reference to the structure of the adaptive rate selection system, the system utilizes a memory and a processor, wherein the processor is programmed by software stored within the memory to perform the step of reading a specified data transmission delay rate for a channel utilized for data transmission. A Reed Solomon encoder is also utilized by the adaptive rate system, which performs the steps of: reading a specified number of redundant bytes in a Reed Solomon frame; determining a level of impulse protection control from the number of redundant bytes in the Reed Solomon frame and a maximum code word length; and determining a number of symbols comprised within the Reed Solomon frame. In addition, an interlever is utilized for determining an interlever depth via use of the number of symbols comprised within the Reed Solomon frame and the specified data transmission delay rate for the channel.

The present invention can also be viewed as providing a method for providing adaptive rate selection to mitigate impulse-like noise and allow for interleaving and RS coding, while not excessively delaying data transmission.

In this regard, the method can be broadly summarized by the following steps: specifying a data transmission delay rate for a channel utilized for data transmission; specifying a number of redundant bytes in a Reed Solomon frame; determining a level of impulse protection control from the number of redundant bytes in the Reed Solomon frame and a maximum code word length; determining a number of symbols comprised within the Reed Solomon frame; and determining an interlever depth via use of the number of symbols comprised within the Reed Solomon frame and the specified data transmission delay rate for the channel.

Other systems and methods of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings. The components of the drawings are not necessarily to scale, emphasis instead being placed upon clearly illustrating the principles of the present invention. Moreover, in the drawings, like referenced numerals designate corresponding parts throughout the several views.

DETAILED DESCRIPTION OF THE PREFERRED EMBODIMENT

Figure 1:
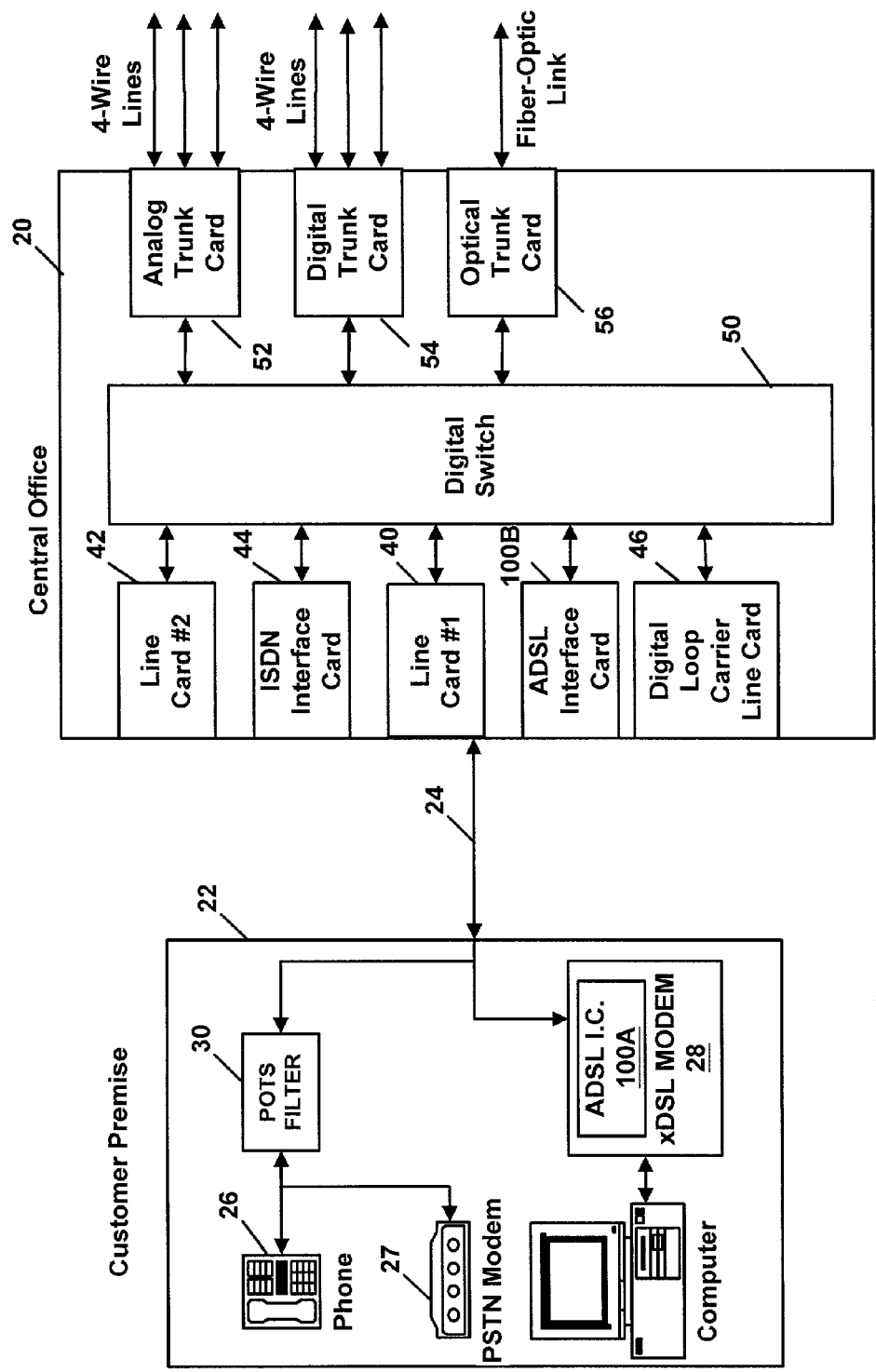
FIG. 1 is a block diagram of a communication system in which the present non-linear distortion removal system may be provided.

Turning to the drawings, wherein like reference numerals designate corresponding parts throughout the drawings, FIG. 1 is a block diagram of a communication system 12 in which the present adaptive rate selection system may be provided. Specifically, FIG. 1 illustrates communication between a central office 20 and a customer premise 22 by way of a local loop 24 or channel. While the customer premise 22 may be a single dwelling residence, a small business, or other entity, it is generally characterized as having POTS equipment, such as a telephone 26, PSTN modem 27, fax machine (not shown), etc. The customer premise 22 may also include an xDSL communication device, such as an xDSL modem 28, comprising an ADSL interface card 100A for handling ADSL services, also referred to herein as a transceiver. When an xDSL service is provided, such as, but not limited to, ADSL, a POTS filter 30 is interposed between the POTS equipment 26 and the local loop 24. As is known, the POTS filter 30 includes a low-pass filter having a cut-off frequency of approximately 4 kilohertz to approximately 10 kilohertz, in order to filter high frequency transmissions from the xDSL communication device 28 and to protect the POTS equipment.

It should be noted that although the present disclosure makes reference to ADSL technology, one skilled in the art will appreciate that other DSL technologies requiring the mitigation of impulse noise generated errors may also be provided for by the present system and method.

Additional circuitry is provided at the central office 20. Generally, a line card 40 containing line interface circuitry is provided for electrical connection to the local loop 24. In fact, multiple line cards may be provided 40, 42 to serve a plurality of local loops 24. In the same way, additional circuit cards are typically provided at the central office 20 to handle different types of services. For example, an integrated services digital network (ISDN) interface card 44, a digital loop carrier line card 46, and other circuit cards, for supporting similar and other communication services, may be provided. Particular to the present system, an ADSL interface card 100B may also be provided at the central office 20, also for handling ADSL services. It should be noted that the ADSL interface card 100A, 100B may alternatively be located exclusively at the central office 20, or exclusively at the customer premise 22.

A digital switch 50 is also provided at the central office 20 and is disposed for communication with each of the various line cards 40, 42, 44, 46, 100B. On the outgoing side of the central office 20 (i.e., the side opposite the various local loops), a plurality of trunk cards 52, 54, 56 are typically provided. For example, an analog trunk card 52, a digital trunk card 54, and an optical trunk card 56 are all illustrated in FIG. 1. Typically, these cards have outgoing lines that support numerous multiplexed transmissions and are typically destined for other central offices or long distance toll offices.

The preferred embodiment of the invention uses DMT line coding techniques, which provide multiple sub-channels for the transmission of information. Typically, as an example for ADSL, DMT divides available bandwidth into 256 sub-carriers, each having a frequency spacing of approximately 4.3 kHz, and carrying a sub-channel, also referred to as a bin or tone. DMT can assign up to 16 bits to each bin, depending on line capacity, impedance, and attenuation. DMT encodes the bits for each sub-channel using signal amplitude and phase shift to produce a burst for that sub-channel. As known by one skilled in the art, each sub-channel is modulated using Quadrature Amplitude Modulation (QAM). Bits within sub-channels are transmitted and received in groups, or symbols. A complete QAM symbol can be represented as a two dimensional constellation of signal points. Generally, 256 complex QAM symbols, which are associated with 256 independent sub-channels, are then converted using an Inverse Fast Fourier Transform (IFFT) yielding a 512 sample DMT symbol. In other words, IFFT maps each QAM symbol into orthogonal frequency bins producing the DMT symbol.

Figure 2:
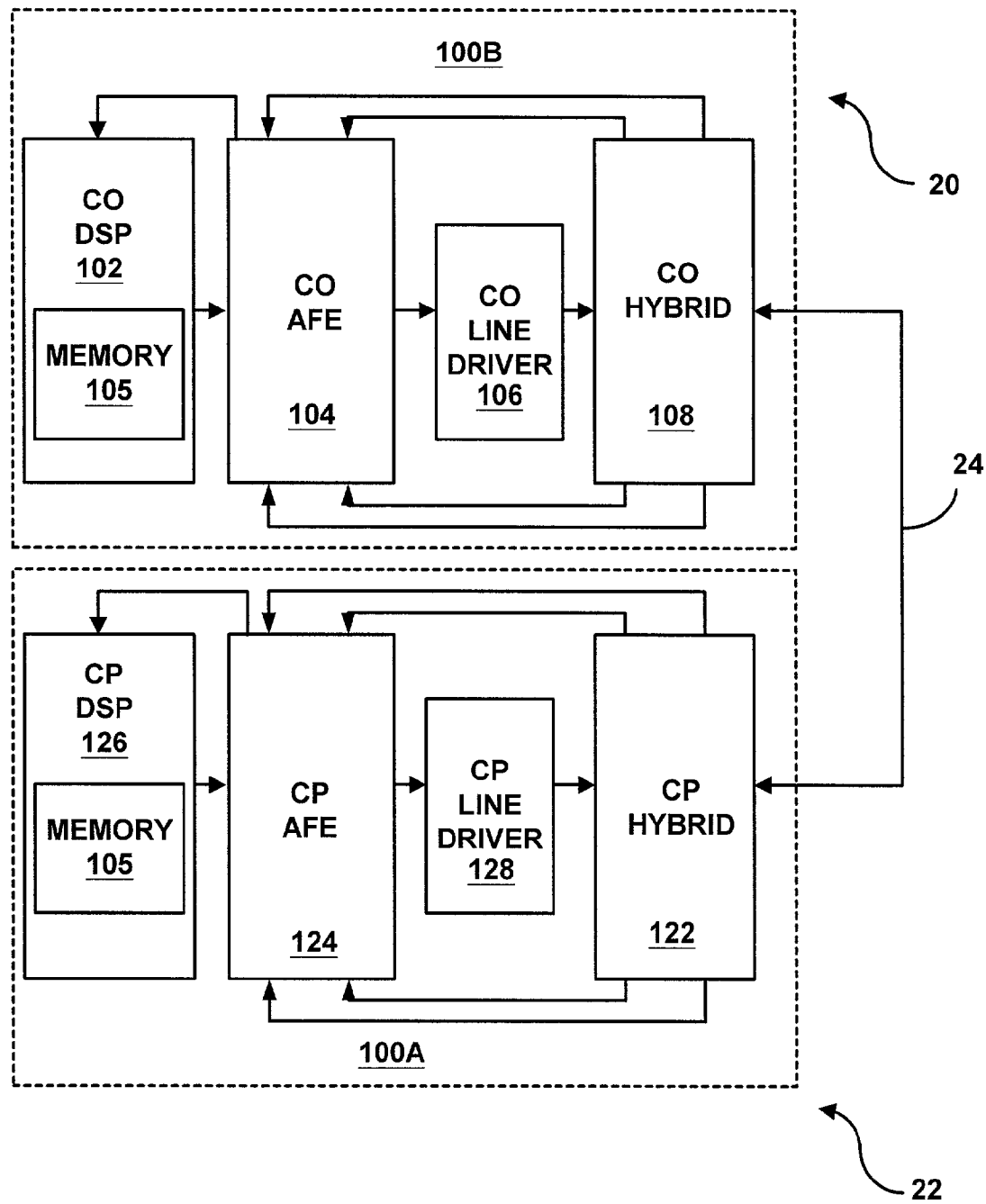
FIG. 2 is a block diagram, further illustrating the ADSL interface card located within the central office of FIG. 1 and the ASDL interface card located within the customer premise of FIG. 1.

FIG. 2 is a block diagram, further illustrating the ADSL interface card 100A located within the CP 22 and the ADSL interface card 100B located within the CO 20. The ADSL interface card 100B located within the central office (CO) 20 comprises a CO digital signal processor (DSP) 102, which receives information from a source such as, but not limited to, a computer, and sends information to a CO analog front end (AFE) 104. The CO AFE 104 is inserted between the local loop 24 and the CO DSP 102 and functions to convert digital data, from the CO DSP 102, into a continuous time analog signal. It should be noted that the DSP 102, further illustrated and described with reference to FIG. 3, located within the ADSL interface card 100 further comprises a memory 105 having software stored therein for purposes of providing adaptive rate selection, as is further discussed hereinbelow.

The analog signal is delivered, via a CO line driver 106, in accordance with the amount of power required to drive the amplified analog signal through the local loop 24 to the CP 22. A CP hybrid 122, located in the CP 22, is then used to de-couple the received signal from the transmitted signal, by subtracting the transmitted signal from the sum of the transmitted and received signals. A CP AFE 124, located in the CP 22, then converts the received analog signal into a digital signal, which is then transmitted to a CP DSP 126 located in the CP 22. Finally, the digital information is transmitted to the data source specified to receive the information.

If however, an analog signal is delivered from the CP 22 to the CO 20, a CP line driver 128 will deliver the signal in accordance with the amount of power required to drive the amplified analog signal through the local loop 24 and to the CO 20. A CO hybrid 108, located in the CO 20, is then used to de-couple the received signal from the transmitted signal, by subtracting the transmitted signal from the sum of the transmitted and received signal. The CO AFE 104, located in the CO 20, then converts the received analog signal into a digital signal, which is then transmitted to the CO DSP 102 located in the CO 20. Finally, the digital information is transmitted to the data source specified to receive the information.

Figure 3:
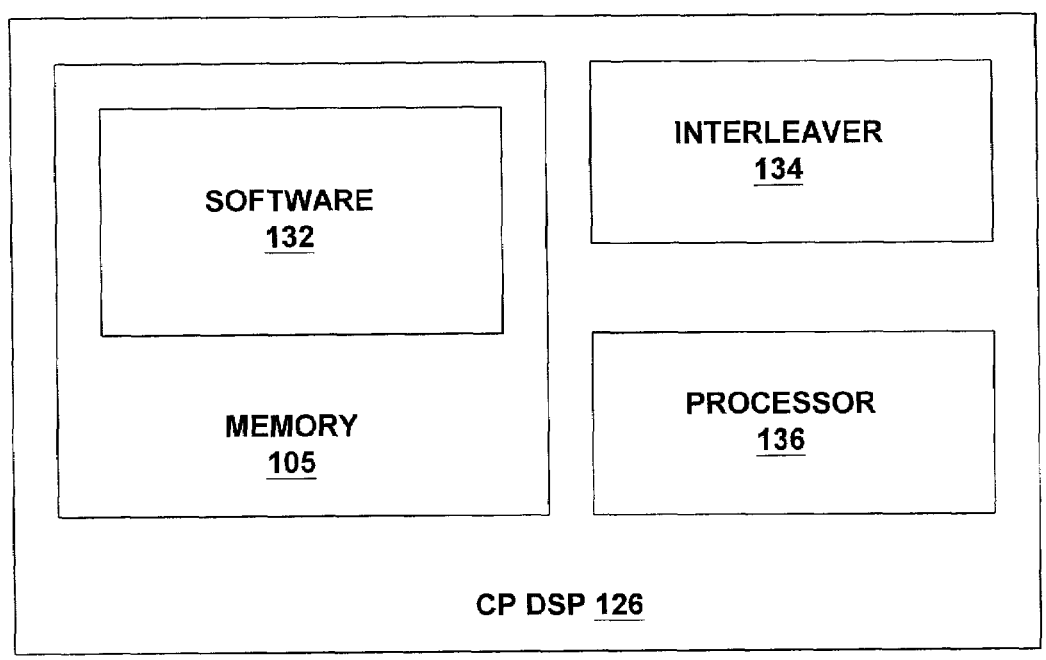
FIG. 3 is a block diagram further illustrating the customer premise of FIG. 2.

FIG. 3 is a block diagram further illustrating the CP DSP 126. It should be noted that the CP DSP 126 and the CO DSP 102 are similar. Therefore, the description with reference to the CP DSP 126 may be referred to for a detailed description of the CO DSP 102. As is shown by FIG. 3, the CP DSP 126 comprises a memory 105, an interleaver 134 and a processor 136. The memory 105 comprises software 132 stored therein, wherein the software 132 defines functionality to be performed in accordance with the present adaptive rate selection system, specifically, Reed Solomon (RS) coding and interleaving. Further illustration and discussion of the memory 105 and function performed by the software 132 is provided hereinbelow with reference to the flowchart of FIG. 5.

The processor 136 performs functions defined by the memory 105 that are not to be performed by the interleaver 134. Functions performed by the interleaver 134 are described in detail hereinbelow with reference to the flowchart of FIG. 5. It should be noted that functions to be performed by the interleaver 134 may instead by compensated for by use of logic within the interleaver 134, such as, but not limited to, switches and circuits, thereby alleviating a need for a memory or software. In addition, RS coding may be performed by an RS encoder, instead of by the processor 136 in accordance with functionality defined by the software 132. If an RS encoder were utilized, an RS decoder would also be located within the CP DSP 126 for purposes of decoding.

Figure 4:
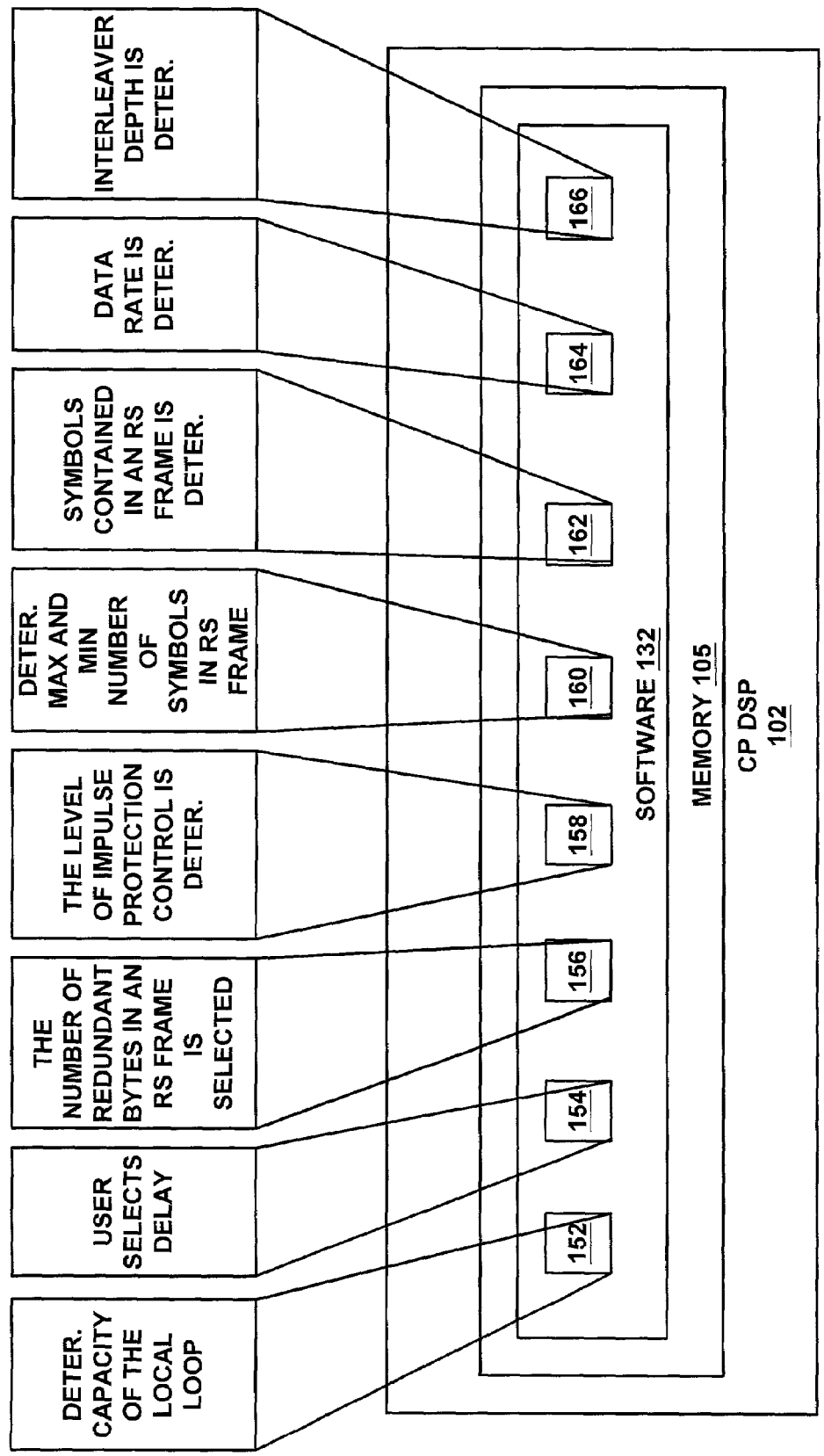
FIG. 4 is a block diagram further illustrating a memory of FIG. 3.

FIG. 4 is a block diagram further illustrating a memory 105 illustrated by FIG. 3. As shown by FIG. 4, the software 132 comprises a series of memory modules 152, 154, 156, 158, 162. Each memory module 152, 154, 156, 158, 162 comprises logic for performing functions specified by the software 132. The functions specified by each memory module 152, 154, 156, 158, 162 are described in further detail with reference to the flowchart of FIG. 5, the description of which is provided hereinbelow.

As is shown by FIG. 4, memory module 152 comprises logic for determining the capacity or data transmission rate of the local loop 24. Memory module 154 comprises logic for reading user selected delay. Memory module 156 comprises logic for reading the selected number of redundant bytes in an RS frame. In addition, memory module 158 comprises logic for determining the level of impulse protection control. Memory module 160 comprises logic for determining a maximum and minimum number of symbols in an RS frame. Memory module 162 comprises logic for determining the number of symbols contained in an RS frame. Memory module 164 comprises logic for determining the data rate. Finally, memory module 166 comprises logic for determining the interleaver depth.

In accordance with a preferred embodiment of the invention, DMT line coding is performed by the ADSL transceiver 100 (interface card). RS coding and interleaving are performed as a part of DMT line coding to minimize the effects of impulses. RS coding ensures that when a small number of bytes in a code word are corrupted, an original Mux frame stored in the code word can still be recovered. The number of redundancy bytes per code word, added to the original signal to be transmitted can be adjusted and is denoted by R. Specifically, the maximum number of error bytes that can be corrected increases as R increases.

When interleaving is performed, multiple Mux frames are coded in a single code word and the code word is then interleaved with other code words that have been interleaved. This procedure spreads byte errors caused by an impulse, or burst. After interleaving is performed, interleaved code words are partitioned into ADSL frames. The number of Mux frames per code word is denoted by S, and interleaver depth is denoted by D. Still further, ADSL frames may be grouped into a superframe that comprises sixty-eight ADSL frames. Each ADSL frame in a superframe is then modulated into a DMT symbol.

In light of the aforementioned, the present adaptive rate selection system utilizes the Reed Solomon configuration parameters R, S and D to minimize the effects of impulses, while considering and addressing data transmission. Different levels of impulse protection are provided, including, but not limited to, normal and enhanced levels, each of which is described in detail hereinbelow.

Figure 5:
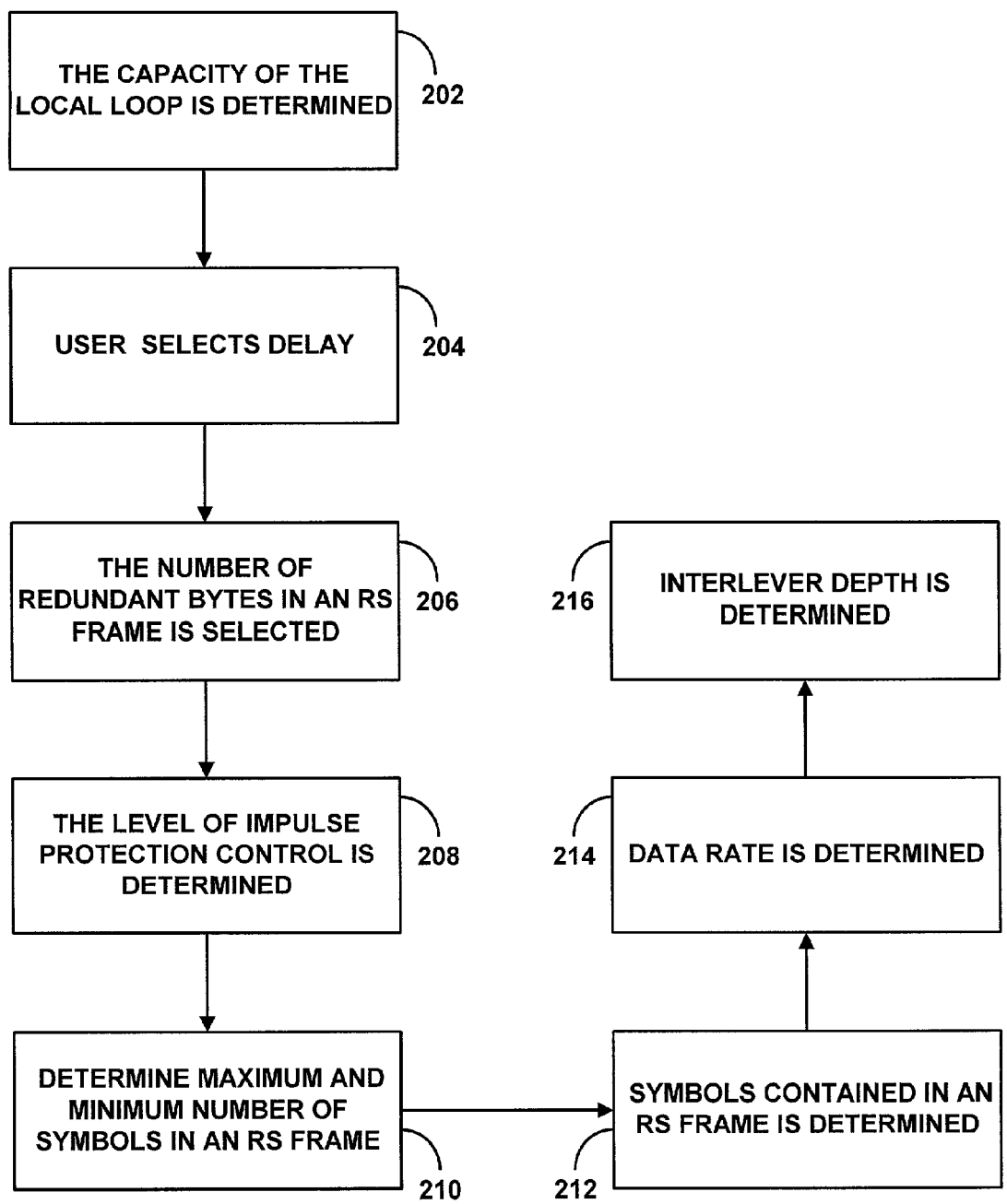
FIG. 5 is a flowchart illustrating functionality performed by the present adaptive rate selection system.

FIG. 5 is a flowchart illustrating functionality performed by the present adaptive rate selection system. As stated hereinabove, the software 132 stored within the memory 105 of the CP DSP 126 defines this functionality. Alternatively, this functionality may be programmed within a Reed Solomon encoder and an interleaver 134. With regard to the flow chart of FIG. 5 described herein, each block represents a module, segment, or portion of code, which comprises one or more executable instructions for implementing the specified logical function(s). It should also be noted that in some alternate implementations, the functions noted in the blocks may occur out of the order noted. For example, two blocks shown in succession may in fact be executed substantially concurrently, or the blocks may sometimes be executed in the reverse order, depending upon the functionality involved.

As is shown by block 202 the capacity of the local loop 24 is determined, thereby determining a maximum number of bytes supported by the capacity of the local loop (N) 24. Different methods may be used to determine the local loop 24 capacity, including, but not limited to, use of equalization and training procedures that are known to those of ordinary skill in the art. The maximum number of bytes supported by the local loop 24, or the loop rate, is denoted by the variable N. As is known in the art, the maximum size of an RS code word is 255 bytes, as is prescribed by the DSL standard.

As is shown by block 204, a value for channel delay may be inputted by the user. It should be noted that the channel delay may be determined automatically by another means. As an example, programs utilized by the customer that use the channel 24 may require a specific measure of channel delay, thereby specifying that a channel delay over a specific value is not acceptable. Although different values may be selected for the delay, it is preferred that the delay value is selected from the values of 1, 2, 4, 8, 16, and 32 ms.

In addition, the number of redundant bytes in an RS frame (R) may be 2, 4, 6, 8, 10, 12, 14, or 16. Typically, the higher the number of redundant bytes in an RS frame, the higher the coding ability utilized. Therefore, 16 redundant bytes are preferably utilized, although other numbers of redundant bytes may be utilized.

As is shown by block 206, the number of redundant bytes in an RS frame (R) is selected to be a specific value. As an example, R may be 16, which provides maximum coding ability for removal of impulse. Therefore, the value of R is selected while considering that a higher value of R equates to increased coding ability.

As is shown by block 208, the level of impulse protection control may then be determined. To determine impulse protection the following equation is utilized.

$$IPD = \text{delay} \times R/(2 \times N\text{max}) \qquad \text{(Eq. 1)}$$

Herein, IPD stands for impulse protection duration in milliseconds, Nmax is a user selected maximum code word length, and, as mentioned hereinabove, R is the number of redundant bytes in an RS frame. As an example, if a user selects normal impulse protection, Nmax would equal 255, which is the maximum size of an RS code word. However, if the user selects enhanced impulse protection, Nmax would equal a number lower than 255, thereby increasing the level of impulse protection.

As is shown by block 210 a minimum and maximum number of symbols in an RS frame is then determined. In accordance with DMT line coding the number of symbols contained in a RS frame (S) may equal ½, 1, 2, 4, 8, or 16. In other words, the number of symbols contained in an RS frame is either ½ 1, 2, 4, 8 or 16. The maximum value of S is determined by the following equation.

$$S\text{max} = \min(16, \text{delay}/4) \qquad \text{(Eq. 2)}$$

Equation two represents that the maximum value of S is equivalent to the minimum value between 16 and the delay divided by four. As an example, if the delay is 32 ms, then the maximum value for S is the smallest of 16 and 8, which is 8.

There are preferably two different ways for selecting the minimum value for S, which leads to different delay constraints. First, the minimum value of S may be represented by the following equation.

$$S\text{min} = \max(1/2, \text{delay} \times 4/D\text{max}) \qquad \text{(Eq. 3)}$$

Herein, Dmax is the maximum interleaver depth allowed, wherein the larger Dmax is, the more memory that is required. Alternatively, Smin may simply be selected to be ½ for better data transmission rate. It should be noted that use of the equation delay×4/Dmax provides control of the desired impulse protection.

As is shown by block 212, the number of symbols contained in an RS frame, denoted by the variable S, is then determined. To determine the number of symbols contained in an RS frame, the maximum number of bytes supported by the local loop capacity (N) multiplied by the number of symbols in an RS frame (S) should be less than or equal to the maximum size of an RS code word (Nmax). This is illustrated by equation 4 provided hereinbelow.

$$N \times S \leq N\text{max} \qquad \text{(Eq. 4)}$$

In accordance with the present system, R and S are selected such that R divided by S is an integer. If R divided by S is not an integer, S is reduced until R divided by S is an integer. As an example, if R is selected to be 12 and S is selected to be 8, the selected value of S may not be utilized. Therefore, S is reduced until R divided by S equates to an integer. In accordance with the present example, S would be reduced until 12 divided by S was an integer, namely until S is 6.

As is shown by block 214, the data rate for the data transmission is determined. To determine the data rate, the framing overhead is subtracted from the line capacity, as is shown by equation five.

$$K = N - R/S - O \qquad \text{(Eq. 5)}$$

Herein, O is the overhead byte specified by the DMT standard. As local loop capacity increases, S changes value which results in sudden changes in RS overhead. To address this factor, equation five is compared to equation six provided hereinbelow.

$$K_{prv} = \text{fix}(N\text{max}/S_{prv}) - R/S_{prv} - O \qquad \text{(Eq. 6)}$$

Herein, Sprv is the previous value of S before downward searching, or reduction, is performed. As an example, in accordance with the example shown above, Sprv would be 8. If Kprv>K and N>fix(Nmax/Sprv), then K=Kprv and S=Sprv. Therefore, the data rate is equal to K×32 (kbps).

As is shown by block 216, the interleaver depth D is then determined. To determine the interleaver depth, thereby completing the required variables for RS encoding, a channel delay is needed. As mentioned hereinabove, the channel delay is a measure of the time, in milliseconds, associated with the transmission of a data packet from the CO 20 to the CP 22, or vice versa. Since the channel delay has been selected hereinabove, it is utilized in determining the interleaver depth D via use of the following equation:

$$\frac{(S \times D)}{4} = \text{Delay} \qquad \text{(Eq. 7)}$$

Since the delay is known, and the maximum number of symbols contained in an RS frame (S) is known, the interleaver depth D may be derived from equation 7.

As has been mentioned hereinabove, two levels of impulse protection are provided, including, a normal and an enhanced level. The customer or user may specify which level of desired impulse protection is desired prior to use of the xDSL modem 28, at initiation of the CP 22, or at any other time.

If the normal impulse protection level is selected, and the user is not capable of supporting the interleaver depth (D), the specified delay utilized by equation two is maintained. In addition, an interleaver depth (D) supported by the user is selected, which, of course, is less than the previously derived interleaver depth. Therefore, the number of symbols contained in the Reed Solomon frame (S) is increased. Since S is increased, the data transmission rate (N) is decreased due to equation one, since N×S<Nmax.

The following provides an example of the normal impulse protection level. The following is assumed for purposes of this example: a user, software, etc., selects the delay to be 64 ms; and the user supports an interleaver depth of 32. If the number of symbols contained in an RS frame (S) is equal to 4, the derived interleaver depth is 64. Unfortunately, an interleaver depth of 64 is not supported by the user. Therefore, in accordance with the normal impulse protection selection, the delay of 64 is maintained and the supported interleaver depth of 32 is selected, resulting in the number of symbols contained in an RS frame (S) to equal 8. As a result, while the data transmission rate was 64 (N×S<Nmax, where S equaled 4), the data transmission rate (N) is now 32, thereby slowing data transmission between the CP 22 and the CO 20.

If the enhanced impulse protection level is selected by the user, then the user desires more impulse protection than normal. To result in more impulse protection, the value of Nmax is decreased from 255 in equation one (N×S<Nmax) is decreased. Specifically, the more the value 255 is decreased, the more impulse protection that is provided. As a result, however, data transmission rate is also decreased, as can be seen by using the value 128 in the above example.

As is known in the art, after performing RS coding and interleaving, RS code words are created which comprise a number of DMT symbols. These code words are then transmitted to a destination, where they are decoded.

The adaptive rate selection system of the present invention can be implemented in software, firmware, hardware, or a combination thereof. In the preferred embodiment of the invention, which is intended to be a non-limiting example, a portion of the system is implemented in software that is executed by a computer, for example, but not limited to, a server, a personal computer, work station, minicomputer, or main frame computer.

The software based portion of the adaptive rate selection system, which comprises an ordered listing of executable instructions for implementing logical functions, can be embodied in any computer-readable medium for use by, or in connection with, an instruction execution system, apparatus, or device such as a computer-based system processor containing system, or other system that can fetch the instructions from the instruction execution system, apparatus, or device and execute the instructions. In the context of this document, a "computer-readable medium" can be any means that can contain, store, communicate, propagate or transport the program for use by or in connection with the instruction execution system, apparatus or device.

The computer-readable medium can be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disk read-only memory (CD ROM) (optical). Note that the computer-readable medium could even be paper or another suitable medium upon which the program is printed, as the program can be electronically captured, via for instance, optical scanning of the paper or other medium, then compiled, interpreted or otherwise processed in a suitable manner, if necessary, and then stored in a computer memory.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A method for providing adaptive rate selection in a discrete multi-tone system, comprising the steps of:
   specifying a data transmission delay rate for a channel utilized for data transmission;
   specifying a number of redundant bytes in a Reed Solomon frame;
   determining a level of impulse protection control from said number of redundant bytes in said Reed Solomon frame and a user selected maximum code word length;
   determining a number of symbols comprised within said Reed Solomon frame; and
   determining an interlever depth via use of said number of symbols comprised within said Reed Solomon frame and said specified data transmission delay rate for said channel.

2. The method of claim 1, further comprising the step of, determining a maximum and minimum number of symbols in said Reed Solomon frame, wherein said number of symbols contained in said Reed Solomon frame is between said maximum and minimum number.

3. The method of claim 2, wherein said maximum number of symbols in said Reed Solomon frame is the lower of the number 16 and, the data transmission delay divided by four.

4. The method of claim 2, wherein said minimum number of symbols in said Reed Solomon frame is the higher of ½, and said data transmission delay multiplied by the quotient of four divided by a maximum interleaver depth.

5. The method of claim 1, further comprising the step of determining capacity of said channel utilized for data transmission, wherein said data rate determination is performed via use of said determined capacity of said channel.

6. The method of claim 1, further comprising the step of determining a data rate of transmission via use of said number of redundant bytes in said Reed Solomon frame and said number of symbols comprised within said Reed Solomon frame.

7. The method of claim 1, wherein said data transmission delay rate is selected by a program utilized by said discrete multi-tone system.

8. The method of claim 1, wherein said data transmission delay rate is selected from at least one of 1, 2, 4, 8, 16 and 32 milliseconds.

9. The method of claim 1, wherein said number of redundant bytes in said Reed Solomon frame is selected from at least one of 2, 4, 6, 8, 10, 12, 14, and 16.

10. The method of claim 1, wherein values of said number of redundant bytes in a Reed Solomon frame and said number of symbols comprised by said Reed Solomon frame are selected such that said number of redundant bytes in a Reed Solomon frame divided by said number of symbols comprised by said Reed Solomon frame is an integer.

11. The method of claim 10, wherein if the result of said division is not an integer, said number of symbols comprised by said Reed Solomon frame is decreased until said number of redundant bytes in a Reed Solomon frame divided by said number of symbols comprised by said Reed Solomon frame is an integer.

12. The method of claim 1, wherein said interleaver depth is equivalent to said data transmission delay rate multiplied by, four divided by said number of symbols comprised by said Reed Solomon frame.

13. A system for providing adaptive rate selection in a discrete multi-tone system, comprising:
a memory; and
a processor programmed by software stored within said memory to perform the steps of:
reading a specified data transmission delay rate for a channel utilized for data transmission;
reading a specified number of redundant bytes in a Reed Solomon frame;
determining a level of impulse protection control from said number of redundant bytes in said Reed Solomon frame and a maximum code word length;
determining a number of symbols comprised within said Reed Solomon frame; and
determining an interlever depth via use of said number of symbols comprised within said Reed Solomon frame and said specified data transmission delay rate for said channel.

14. The system of claim 13, wherein said processor is further programmed to determining a maximum and minimum number of symbols in said Reed Solomon frame, wherein said number of symbols contained in said Reed Solomon frame is between said maximum and minimum number.

15. The system of claim 14, wherein said maximum number of symbols in said Reed Solomon frame is the lower of the number 16 and, the data transmission delay divided by four.

16. The system of claim 14, wherein said minimum number of symbols in said Reed Solomon frame is the higher of ½, and said data transmission delay multiplied by the quotient of four divided by a maximum interleaver depth.

17. The system of claim 13, wherein said processor is further programmed to determine capacity of said channel utilized for data transmission, wherein said data rate determination is performed via use of said determined capacity of said channel.

18. The system of claim 13, wherein said processor is further programmed to determine a data rate of transmission via use of said number of redundant bytes in said Reed Solomon frame and said number of symbols comprised within said Reed Solomon frame.

19. The system of claim 13, wherein said data transmission delay rate is selected by a program utilized by said discrete multi-tone system.

20. The system of claim 13, wherein said number of redundant bytes in said Reed Solomon frame is selected from at least one of 2, 4, 6, 8, 10, 12, 14, and 16.

21. The system of claim 13, wherein values of said number of redundant bytes in a Reed Solomon frame and said number of symbols comprised by said Reed Solomon frame are selected such that said number of redundant bytes in a Reed Solomon frame divided by said number of symbols comprised by said Reed Solomon frame is an integer.

22. The system of claim 21, wherein if the result of said division is not an integer, said number of symbols comprised by said Reed Solomon frame is decreased until said number of redundant bytes in a Reed Solomon frame divided by said number of symbols comprised by said Reed Solomon frame is an integer.

23. The system of claim 13, wherein said interleaver depth is equivalent to said data transmission delay rate multiplied by, four divided by said number of symbols comprised by said Reed Solomon frame.

24. A system for providing adaptive rate selection in a discrete multi-tone system, comprising:
a memory; and,
a processor programmed by software stored within said memory to perform the step of reading a specified data transmission delay rate for a channel utilized for data transmission;
a Reed Solomon encoder that performs the steps of:
reading a specified number of redundant bytes in a Reed Solomon frame;
determining a level of impulse protection control from said number of redundant bytes in said Reed Solomon frame and a maximum code word length; and
determining a number of symbols comprised within said Reed Solomon frame; and
an interlever for determining an interlever depth via use of said number of symbols comprised within said Reed Solomon frame and said specified data transmission delay rate for said channel.

25. The system of claim 24, wherein said Reed Solomon encoder further performs the step of: determining a maximum and minimum number of symbols in said Reed Solomon frame, wherein said number of symbols contained in said Reed Solomon frame is between said maximum and minimum number.

26. A system for providing adaptive rate selection in a discrete multi-tone system, comprising:
means for specifying a data transmission delay rate for a channel utilized for data transmission;
means for specifying a number of redundant bytes in a Reed Solomon frame;
means for determining a level of impulse protection control from said number of redundant bytes in said Reed Solomon frame and a maximum code word length;
means for determining a number of symbols comprised within said Reed Solomon frame; and
means for determining an interlever depth via use of said number of symbols comprised within said Reed Solomon frame and said specified data transmission delay rate for said channel.

27. The system of claim 26, further comprising means for determining a maximum and minimum number of symbols in said Reed Solomon frame, wherein said number of symbols contained in said Reed Solomon frame is between said maximum and minimum number.

28. The system of claim 27, wherein said maximum number of symbols in said Reed Solomon frame is the lower of the number 16 and, the data transmission delay divided by four.

29. The system of claim 27, wherein said minimum number of symbols in said Reed Solomon frame is the higher of ½, and said data transmission delay multiplied by the quotient of four divided by a maximum interleaver depth.

30. The system of claim 26, further comprising means for determining capacity of said channel utilized for data transmission, wherein said data rate determination is performed via use of said determined capacity of said channel.

31. The system of claim 26, further comprising means for determining a data rate of transmission via use of said number of redundant bytes in said Reed Solomon frame and said number of symbols comprised within said Reed Solomon frame.

32. The system of claim 26, wherein said data transmission delay rate is selected by a program utilized by said discrete multi-tone system.

33. The system of claim 26, wherein said data transmission delay rate is selected from at least one of 1, 2, 4, 8, 16 and 32 milliseconds.

34. The system of claim 26, wherein said number of redundant bytes in said Reed Solomon frame is selected from at least one of 2, 4, 6, 8, 10, 12, 14, and 16.

35. The system of claim 26, wherein values of said number of redundant bytes in a Reed Solomon frame and said number of symbols comprised by said Reed Solomon frame are selected such that said number of redundant bytes in a Reed Solomon frame divided by said number of symbols comprised by said Reed Solomon frame is an integer.

36. The system of claim 35, wherein if the result of said division is not an integer, said number of symbols comprised by said Reed Solomon frame is decreased until said number of redundant bytes in a Reed Solomon frame divided by said number of symbols comprised by said Reed Solomon frame is an integer.

37. The system of claim 26, wherein said interleaver depth is equivalent to said data transmission delay rate multiplied by, four divided by said number of symbols comprised by said Reed Solomon frame.

38. The system of claim 26, wherein, if capacity of said channel increases, said number of symbols comprised in said Reed Solomon frame changes value, resulting if a change in Reed Solomon overhead.

* * * * *